(12) United States Patent
Millett et al.

(10) Patent No.: US 7,774,347 B2
(45) Date of Patent: Aug. 10, 2010

(54) VORTEX SEARCHING

(75) Inventors: Ronald P. Millett, Orem, UT (US);
Dillon K. Inouye, Provo, UT (US); John C. Higgins, Orem, UT (US)

(73) Assignee: Perfect Search Corporation, Provo, UT (US)

( * ) Notice: Subject to any disclaimer, the term of this patent is extended or adjusted under 35 U.S.C. 154(b) by 343 days.

(21) Appl. No.: 11/847,688

(22) Filed: Aug. 30, 2007

(65) Prior Publication Data
US 2009/0063454 A1   Mar. 5, 2009

(51) Int. Cl.
G06F 7/00  (2006.01)

(52) U.S. Cl. ............................ 707/747; 707/791

(58) Field of Classification Search ............ None
See application file for complete search history.

(56) References Cited

U.S. PATENT DOCUMENTS

| | | | |
|---|---|---|---|
| 4,961,139 A | 10/1990 | Hong et al. | |
| 5,530,854 A | 6/1996 | Emery et al. | |
| 5,664,179 A * | 9/1997 | Tucker | 707/100 |
| 5,699,441 A | 12/1997 | Sagawa | |
| 5,701,459 A | 12/1997 | Millett | |
| 5,737,734 A | 4/1998 | Schultz | |
| 5,740,445 A * | 4/1998 | Okuda | 707/102 |
| 5,761,652 A | 6/1998 | Wu | |
| 5,799,312 A | 8/1998 | Rigoutsos | |
| 6,018,733 A | 1/2000 | Kirsch et al. | |
| 6,026,398 A | 2/2000 | Brown | |
| 6,128,613 A | 10/2000 | Wong et al. | |
| 6,216,123 B1 | 4/2001 | Robertson et al. | |
| 6,233,571 B1 | 5/2001 | Egger et al. | |
| 6,253,188 B1 | 6/2001 | Witek | |
| 6,473,729 B1 | 10/2002 | Gastaldo et al. | |

(Continued)

FOREIGN PATENT DOCUMENTS

WO   WO2007082212 A2   7/2007

(Continued)

OTHER PUBLICATIONS

U.S. Appl. No. 11/328,863, filed Jan. 10, 2006, Millett.

(Continued)

*Primary Examiner*—Tim T. Vo
*Assistant Examiner*—Jau-Shya Meng
(74) *Attorney, Agent, or Firm*—Workman Nydegger

(57) ABSTRACT

Determining intersection points of parameter patterns. Parameter patterns are specified in a query. A method includes identifying a first parameter pattern from the query as occurring less often in the index than one other parameter pattern in the query. The data store is searched until a present location of the data store has been identified as including the first parameter pattern. Then the data store is searched for a location of another parameter pattern. If the present location is identified as including the another parameter pattern, then an indication is provided identifying an intersection. Otherwise, the method includes continuing searching remaining portions of the data store to find a location of the another parameter pattern at a new present location. At least one of the acts of searching above includes eliminating at least a portion of records of the data store from searching without being searched prior to being eliminated.

16 Claims, 7 Drawing Sheets

U.S. PATENT DOCUMENTS

| | | |
|---|---|---|
| 6,584,458 B1 | 6/2003 | Millett et al. |
| 6,584,465 B1 | 6/2003 | Zhu et al. |
| 6,658,626 B1 | 12/2003 | Aiken |
| 6,718,325 B1 | 4/2004 | Chandra |
| 6,748,401 B2 | 6/2004 | Blackburn |
| 6,772,141 B1 | 8/2004 | Pratt |
| 6,778,981 B2 | 8/2004 | Lee |
| 6,785,677 B1 | 8/2004 | Fritchman |
| 6,804,664 B1 | 10/2004 | Hartman et al. |
| 6,947,931 B1 | 9/2005 | Bass et al. |
| 6,985,904 B1 | 1/2006 | Kaluskar et al. |
| 6,993,533 B1 | 1/2006 | Barnes |
| 7,139,753 B2 | 11/2006 | Bass et al. |
| 7,181,438 B1 | 2/2007 | Szabo |
| 7,266,553 B1 | 9/2007 | Anderson et al. |
| 7,590,716 B2 | 9/2009 | Sinclair |
| 2002/0099536 A1 | 7/2002 | Bordner et al. |
| 2002/0099685 A1* | 7/2002 | Takano et al. ............... 707/1 |
| 2004/0225643 A1 | 11/2004 | Alpha et al. |
| 2004/0260694 A1 | 12/2004 | Chaudhuri et al. |
| 2005/0108394 A1 | 5/2005 | Braun et al. |
| 2005/0131872 A1 | 6/2005 | Calbucci et al. |
| 2005/0171926 A1* | 8/2005 | Thione et al. ............... 707/1 |
| 2006/0004740 A1* | 1/2006 | Dettinger et al. ............ 707/4 |
| 2006/0036649 A1 | 2/2006 | Simske et al. |
| 2006/0080361 A1 | 4/2006 | Suzuki |
| 2006/0106793 A1 | 5/2006 | Liang |
| 2006/0126916 A1 | 6/2006 | Kokumai |
| 2006/0212420 A1* | 9/2006 | Murthy ............... 707/1 |
| 2006/0235843 A1 | 10/2006 | Musgrove et al. |
| 2007/0027864 A1 | 2/2007 | Collins et al. |
| 2007/0033165 A1 | 2/2007 | Sheinwald et al. |
| 2007/0073894 A1 | 3/2007 | Erickson et al. |
| 2007/0106876 A1 | 5/2007 | Goswami |
| 2007/0156677 A1 | 7/2007 | Szabo |
| 2007/0162481 A1* | 7/2007 | Millett ............... 707/101 |
| 2007/0175674 A1* | 8/2007 | Brinson et al. ............ 177/136 |
| 2007/0203898 A1 | 8/2007 | Carmona |
| 2007/0250494 A1 | 10/2007 | Peoples et al. |
| 2008/0154938 A1* | 6/2008 | Cheslow ............... 707/102 |
| 2009/0019038 A1 | 1/2009 | Millett |

FOREIGN PATENT DOCUMENTS

| | | |
|---|---|---|
| WO | WO2007103815 A2 | 9/2007 |

OTHER PUBLICATIONS

U.S. Appl. No. 60/779,214, filed Mar. 3, 2006, Millett.

Manning, Christopher D. and Schutze, Hinrich Foundations of Statistical Natural Language Processing, The MIT Press, Cambridge Massachusetts, May 1999 (pp. 151, 158, 192-194, 377 and 532).

Mitra, Mandar et al. "An Analysis of Statistical and Syntactic Phrases", Jun. 1997.

Possas, Bruno et al. "Set-Based Vector Model: An Efficient Approach for Correlation-Based Ranking", Oct. 2005.

Office Action mailed Feb. 20, 2008 cited in related case U.S. Appl. No. 11/328,863.

Office Action dated Dec. 29, 2008 cited in U.S. Appl. No. 11/681,673.

U.S. Appl. No. 12/143,432, filed Jun. 20, 2008, Millett.

U.S. Appl. No. 12/143,441, filed Jun. 20, 2008, Millett.

Ceglowski, Maciej "Using Bloom Filters", Apr. 8, 2004, http://www.perl.com/pub/a/2004/04/08/bloom_filters.html, 4 pages.

U.S. Appl. No. 11/681,673, filed Mar. 2, 2007, Millett, et al.

U.S. Appl. No. 11/847,869, filed Aug. 30, 2007, Millett, et al.

U.S. Appl. No. 11/847,784, filed Mar. 30, 2007, Millett, et al.

Notice of Allowance mailed in U.S. Appl. No. 11/681,673 Oct. 5, 2009.

Office Action dated Jan. 8, 2010 cited in U.S. Appl. No. 11/847,869.

Office Action dated Mar. 4, 2010 cited in U.S. Appl. No. 11/847,784.

* cited by examiner

| Offset | Data Store Records |
|---|---|
| 0000000000 | 1, 3, 5, 7, 9, 11, 13, 15 |
| 0000000001 | 17, 19, 21, 23, 25, 27, 31 |
| . . . | |
| 1001101111 | 9,969, 9,971, 9,973, 9,975, 9,977, 9,979, 9,981, 9,983 |
| 1001110000 | 9,985, 9,987, 9,989, 9,991, 9,993, 9,995, 9,997, 9,999, |

FIG. 1

| 0 | 1 | 2 | 3 | 4 | 5 | 6 | 7 | 8 | 9 | a | B | C | D | E | F | 10 | 11 | 12 | 13 | 14 | 15 | 16 | 17 | 18 | 19 | 1a | 1b | 1c | 1d | 1e | 1f |
|---|---|---|---|---|---|---|---|---|---|---|---|---|---|---|---|----|----|----|----|----|----|----|----|----|----|----|----|----|----|----|----|
| 0 | 0 | 0 | 1 | 0 | 1 | 0 | 0 | 0 | 1 | 1 | 0 | 0 | 0 | 0 | 0 | 0  | 1  | 0  | 0  | 0  | 1  | 1  | 0  | 1  | 1  | 0  | 0  | 1  | 0  | 1  | 1  |

← 302

|   |   |   | Hash | Last 8 Bits Of Hash | Last 5 Bits Of Hash | Hex Of Last 5 Bits |
|---|---|---|------|---------------------|---------------------|--------------------|
|   |   | fox | 40b8636cf497235c | 01011100 | 11100 | 1C |
|   | red |   | 100519ba18172d8 | 11011000 | 11000 | 18 |
|   | red | fox | f9d6824a13b3ed25 | 00100101 | 00101 | 5 |
| quick |   |   | b249f6d0e2e948fc | 11111100 | 11100 | 1C |
| quick |   | fox | ec45e8c4c06bed36 | 00110110 | 10110 | 16 |
| quick | red |   | b0cc990de2fd626d | 01101101 | 01101 | D |
| quick | red | fox | 1c1539fdf2306635 | 00110101 | 10101 | 15 |
| The |   |   | 1a6a89be20908b63 | 01100011 | 00011 | 3 |
| The |   | fox | 679e70ee245a112d | 00101101 | 01101 | D |
| The | red |   | 0ffc1785181760df | 11011111 | 11111 | 1F |
| The | red | fox | 56cf1314b42ff1d1 | 11010001 | 10001 | 11 |
| The | quick |   | 00bf1348c0e06f58 | 01011000 | 11000 | 18 |
| The | quick | fox | 272dc1de87ccca95 | 10010101 | 10101 | 15 |
| The | quick | red | fe417665c0f445c9 | 11001001 | 01001 | 9 |
| The | quick | red | fox | e6305123b5974196 | 10010110 | 10110 | 16 |

FIG. 3

Sorted Hash Keyed Index Records using Linked List 400

| Index Record Address | Previous Index Record | Next Index Record | Hash Identifier | Number Of Data Store Records | Data Store Records |
|---|---|---|---|---|---|
| 0345 | 0 | 1297 | 0b0e3aee | 5 | 1, 2, 3, 5, 7 |
| 1297 | 0345 | 03bc | 0da77c46 | 1 | 2 |
| 03bc | 1297 | 53aa | 1cc4576c | 1 | 4 |
| 53aa | 03bc | 4545 | 28bbc6e4 | 2 | 2, 5 |
| 4545 | 53aa | 8c01 | 42545e50 | 6 | 1, 3, 5, 7, 9, 10, 11 |
| 8c01 | 4545 | 4397 | 689fb69a | 3 | 4, 5, 7 |
| 4397 | 8c01 | 7730 | 79f0a667 | 1 | 3 |
| 7730 | 4397 | abcd | 7cfc6d29 | 1 | 7 |
| abcd | 7730 | 1756 | 84c3e1a8 | 1 | 9 |
| 1756 | abcd | 3492 | b1bd9e7c | 1 | 1 |
| 3492 | 1756 | bc00 | b37a312c | 2 | 1, 11 |
| bc00 | 3492 | 0198 | d26a6981 | 3 | 2, 5, 10 |
| 0198 | bc00 | 2785 | d6401941 | 1 | 6 |
| 2785 | 0198 | 0abd | d88a8dec | 2 | 8, 12 |
| 0abd | 2785 | edde | ee91d57e | 6 | 1, 2, 3, 4, 7, 9 |
| edde | 0abd | 0 | f47f1d31 | 3 | 1, 5, 11 |

FIG. 4A

Sorted Hash Keyed Index Records using Linked List — 400

| Index Record Address (404) | Previous Index Record (406) | Next Index Record (408) | Hash Identifier (402) | Number Of Data Store Records | Data Store Records |
|---|---|---|---|---|---|
| 0345 | 0 | 1297 | 0b0e3aee | 5 | 1,2,3,5,7 |
| 1297 | 0345 | 03bc | 0da77c46 | 1 | 2 |
| 03bc | 1297 | 53aa | 1cc4576c | 1 | 4 |
| 53aa | 03bc | 4545 | 28bbc6e4 | 2 | 2,5 |
| 4545 | 53aa | f017 | 4245e50 | 6 | 1,3,5,7,9,10,11 |
| f017 | 4545 | 8c01 | 5b72a624 | 1 | 12 |
| 8c01 | f017 | 4397 | 689fb69a | 3 | 4,5,7 |
| 4397 | 8c01 | 7730 | 79f0a667 | 1 | 3 |
| 7730 | 4397 | abcd | 7cfc6d29 | 1 | 7 |
| abcd | 7730 | 1756 | 84c3e1a8 | 1 | 9 |
| 1756 | abcd | 3492 | b1bd9e7c | 1 | 1 |
| 3492 | 1756 | bc00 | b37a312c | 2 | 1,11 |
| bc00 | 3492 | 0198 | d26a6981 | 3 | 2,5,10 |
| 0198 | bc00 | 2785 | d6401941 | 1 | 6 |
| 2785 | 0198 | 0abd | d88a8dec | 2 | 8,12 |
| 0abd | 2785 | edde | ee91d57e | 6 | 1,2,3,4,7,9 |
| edde | 0abd | 0 | f47f1d31 | 3 | 1,5,11 |

410 points to row f017 / Data Store Records = 12

FIG. 4B

Offset Correlation Table (4 bit)
for Hash Keyed Index Records

| 4 top bits of hash | Index Record Addr |
|---|---|
| (x0) 0000 | 0345 |
| (x1) 0001 | 03bc |
| (x2) 0010 | 53aa |
| (x3) 0011 | -1 |
| (x4) 0100 | 4545 |
| (x5) 0101 | -1 |
| (x6) 0110 | 8c01 |
| (x7) 0111 | 4397 |
| (x8) 1000 | abcd |
| (x9) 1001 | -2 |
| (xA) 1010 | -1 |
| (xB) 1011 | 1756 |
| (xC) 1100 | -1 |
| (xD) 1101 | bc00 |
| (xE) 1110 | 0abd |
| (xF) 1111 | edde |

FIG. 5A — 500

Offset Correlation Table (4 bit)
for Hash Keyed Index Records

| 4 top bits of hash | Index Record Addr |
|---|---|
| (x0) 0000 | 0345 |
| (x1) 0001 | 03bc |
| (x2) 0010 | 53aa |
| (x3) 0011 | -1 |
| (x4) 0100 | 4545 |
| (x5) 0101 | f107 |
| (x6) 0110 | 8c01 |
| (x7) 0111 | 4397 |
| (x8) 1000 | abcd |
| (x9) 1001 | -2 |
| (xA) 1010 | -1 |
| (xB) 1011 | 1756 |
| (xC) 1100 | -1 |
| (xD) 1101 | bc00 |
| (xE) 1110 | 0abd |
| (xF) 1111 | edde |

FIG. 5B

VORTEX SEARCHING

BACKGROUND

Background and Relevant Art

Computers and computing systems have affected nearly every aspect of modern living. Computers are generally involved in work, recreation, healthcare, transportation, entertainment, household management, etc.

Traditional search engines use indexes to search for information in records in a data space. The indexes are arranged as alphabetically ordered word indexes indicating where a particular word, phrase or other search term may be found. Boolean searching is able to be performed using traditional indexes in traditional search engines by identifying records in the data space that include the Boolean arguments, i.e. search terms, and then applying a specified Boolean operator to the records. For example, consider the case where a user wishes to find a record which includes all of the terms "quick," "red," and "fox." Using a traditional search engine, to find the records with all three of these terms, first the index is used to identify all records including the term "quick." Then, the index is used to find all records including the term "red." The index is also used to find all of the records including the term "fox." A comparison of the records is then made using a Boolean AND operation that is performed on the records identified for "quick," the records identified for "red," and the records identified for "fox." The result of the AND operation is the desired records. Because of this ANDing process, traditional search engines require large amounts of processing power when one or more of the entries in an index is dense.

Additionally, as described previously, traditional search engines used an alphabetically ordered index. For example, a word or phrase may be listed in the index along with references to the records in which the word or phrase appears.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method which may be practiced in a computing environment including a data store including data items. The method includes acts for determining one or more intersection points of parameter patterns in data items. The parameter patterns are specified in a query including N parameter patterns. The method includes identifying a first parameter pattern from the query as occurring less often in the index than at least one other parameter pattern specified in the query. The data store is searched until a present location of the data store has been identified as including the first parameter pattern. Then the data store is searched for a location of another parameter pattern from the query. If the present location is identified as including the another parameter pattern, then an indication is provided identifying an intersection. Otherwise, the method includes continuing searching remaining portions of the data store to find a location of the another parameter pattern in the data store at a new present location. At least one of the acts of searching above includes eliminating at least a portion of records of the data store from searching without being searched prior to being eliminated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates an offset correlation table;

FIG. 3 illustrates an abbreviated index indexing hash keys of parameter patterns;

FIG. 4A illustrates a sorted hash keyed index;

FIG. 4B illustrates the sorted hash key index of FIG. 4A after a new entry has been added; and FIG. 5A illustrates an offset correlation table used for adding index entries to the sorted hash key index of FIG. 4A; and FIG. 5B illustrates the offset correlation table of FIG. 5A after an update.

DETAILED DESCRIPTION

Figure 2:
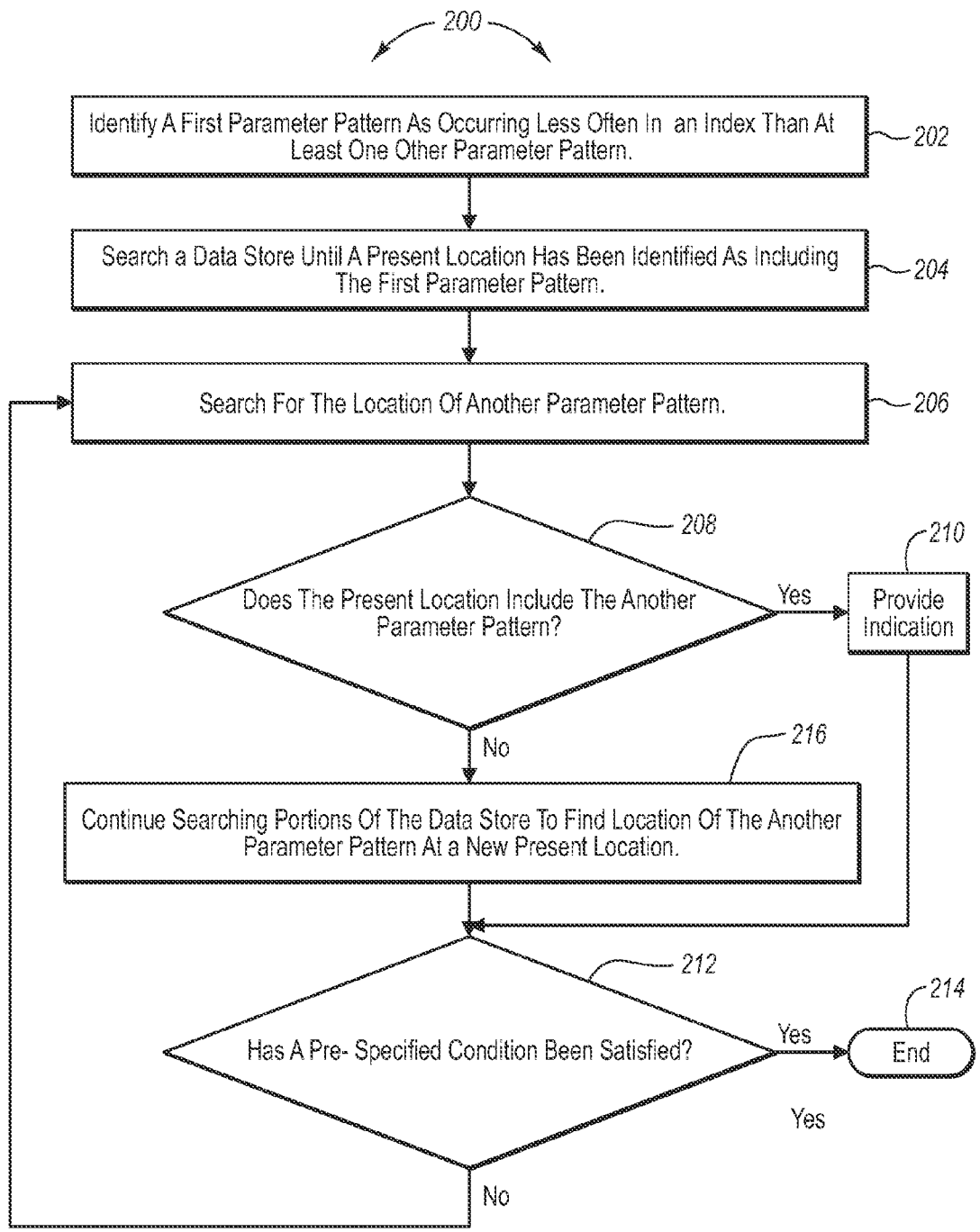
FIG. 2 illustrates a method of determining intersection points.

Embodiments herein may comprise a special purpose or general-purpose computer including various computer hardware, as discussed in greater detail below.

Some embodiments described herein improve upon traditional indexing techniques by reducing the amount of searching and/or comparing that is performed to identify records with particular parameter patterns specified in a search. Note that when reference is made to searching a data store herein, searching of the data store may be performed by searching an index, without any actual comparison in the records of the data store. Eliminating the amount of searching can be accomplished in a number of different ways. For example the amount of searching performed can be reduced by selecting the order in which parameter patterns are searched for in a data store. Specifically, by searching first for parameter patterns which appear less or least frequently in the data store before searching for parameter patterns that are included more frequently in the data store, searching can be reduced by jumping over portions of the data store and eliminating those portions from being searched.

Parameter patterns include one or more elements, which may be specified for a particular search. For example, a parameter pattern may be a word, phrase, number, date, etc. Parameter patterns may also include patterns for other types of patterns such as image patterns, sound patterns, fingerprint patterns, voice patterns, etc. Other patterns may also be used within the scope of parameter patterns.

Additionally, some embodiments further optimize searching by using randomization techniques such as hashing of parameter patterns and indexing the hashes to index parameter patterns to create a more evenly distributed index which facilitates efficient index searching. Further still, some embodiments accomplish jumping over of portions of index entries by using speed-up data structures such as offset correlation entries to reduce the number of comparisons that need to be performed. Even further still, some embodiments used the efficiencies obtained by processor caching to further improve searching efficiency.

Further optimizations can be obtained by eliminating searches of the data store that are performed using a full text index by using an abbreviated index which may be implemented as a probabilistic indicator that parameter patterns might be found in a data store, and a certain indicator that searches or search terms will not be found in a data store. Additionally, optimizations may be obtained by eliminating entire queries such as a search including N parameter patterns by determining that parameters patterns or combinations of parameter patterns from the N parameter patterns are not found in any record of the data store. These optimizations will be discussed in more detail below.

In some embodiments described herein searching is made more efficient by reducing the number of records on which Boolean intersection techniques are applied. This may be accomplished by eliminating records from searching For example, consider the following index entries:

| | |
|---|---|
| quick | 1, 9,999 |
| red | 5, 9, 13, 500, 723, 9,999 |

Assume that a user specified in a query that these parameter patterns are to be found in the same record of the data store. In traditional search techniques, the following Boolean comparisons would need to be performed quick(1) AND red(5), quick(9,999) AND red(5), quick(9,999) AND red(9), quick (9,999) AND red(13), quick(9,999) AND red(500), quick(9, 999) AND red(723), and quick(9,999) AND red(9,999), where the only intersection found is at quick(9,999) AND red(9,999).

However, using one embodiment described herein, the complexity and number of compare operations can be reduced in a search for intersection of records. For example, one or more of the comparisons including data store record identifiers for "red" including 5, 9, 13, 500, and 723 can be eliminated from comparisons to data store record identifier 9,999 for quick.

In one embodiment, it is desirable to select a first parameter pattern to be searched for first. This first parameter pattern should be selected such that it occurs in the data store or an index of the data store less than at least one other parameter pattern specified in the query. Preferably, the first parameter pattern should be the least frequent occurring parameter pattern of all the parameter patterns specified in the query. In the present example, "quick" is selected as the first parameter pattern. Illustratively, the index may be searched for the first occurrence of the parameter pattern "quick." This occurs in record I as illustrated by the above the index. The index is then searched for the next parameter pattern. In the present example, "red" is the next parameter pattern. It is discovered by referencing the index that an occurrence of the parameter pattern "red" occurs in record 5. A comparison of the locations reveals that they are not the same, and thus, there is no intersection. Additionally, because record number 5 is after record number 1, the index is consulted to find the next occurrence of the parameter pattern "quick," which occurs at 9,999. At this point, a comparison may be performed to determine if it is beneficial to perform a jump over one or more data store record entries between 5 and 9,999. Because of the large number of data store records between 5 and 9,999, a decision is made to jump data store records. Various jump mechanisms can be used, as will be discussed further below. The jump mechanisms can jump records such that comparisons are performed again near or at the largest record. For example, data store records 9, 13, 500, 723 can be jumped such that the next compare is quick(9,999) AND red(9,999), which yields an intersection.

As alluded to previously, proper selection of the first searched parameter pattern may reduce the number of index accesses and Boolean operations. For example, in one embodiment, a parameter pattern that appears less in the index than other parameter patterns will be searched before searching for the other parameter patterns. Further, in some embodiments less common terms are always searched before more common terms.

Similarly other efficiencies may be obtained by searching parameter patterns that are the most evenly distributed across the data store or that have large gaps between occurrences. Notably, to obtain these efficiencies, there should be a balance between the amount of time saved by not performing comparisons and the amount of time needed to calculate the most optimal parameter pattern to search next. In some cases it may be more efficient to simply perform the comparisons rather than calculating the most efficient parameter pattern to search next.

Jumps may be accomplished by using a speed-up data structure that allows for skipping of a number of record comparisons may be implemented. One speedup structure is a multi-level bit reduction structure. An example of this structure is now illustrated. Assume that an example index is as follows:

| | |
|---|---|
| quick | 1, 3, 7, 9, 11, 13, 15, 17, 19, 21, 23, 25, 27, 29, 31, 33, 35, 37 |
| red | 2, 35 |

A speedup data structure for the index entry "quick" may be implemented. The speedup data structure is as follows:

| References: | 1, | 3, | 5, | 7, | 9, | 11, | 13, | 15, | 17, | 19, | 21, | 23, | 25, | 27, | 29, | 31, | 33, 35, 37 |
|---|---|---|---|---|---|---|---|---|---|---|---|---|---|---|---|---|---|
| Level 1: | 1, | | | | 9, | | | | 17, | | | | 25, | | | | 33[END] |
| Level 2: | 1, | | | | | | | | | | | | | | | | 33[END] |

Levels 1 and 2, in this embodiment, contain pointers to references in the base index entry based on a particular logical interval. For example, notice that Level 1 is based on an interval of 8. As will be shown later, this allows for a two bit shift to be performed to switch comparing from the reference list to Level 1. Similarly, Level 2 has an interval of 32, which allows for another two bit shift to shift comparison from Level 1 to Level 2. Notably, specifying an interval which allows for a level shift using 5 bits has proven to be more effective in obtaining speedups, as shifting from level to level can be expensive in terms of processing power. However, the 2 bit shift shown here is easier to illustrate and as such is used for example purposes.

Illustrating now the functionality of the speedup data structure, to find an intersection between quick and red, the following comparisons are performed: red(2) AND quick(1), red(2) AND quick(3), quick(3) AND red(35), quick(5) AND red(35), and quick(7) AND red(35) in the data store reference list. 9 is a boundary between the data store reference list and Level 1, as such, a shift may be made to Level 1 for further comparisons. The decision to shift to Level 1 may be made using any one of a number of different criteria. In one embodiment, the decision is made based on the magnitude of the difference between the record numbers being compared at the boundary. In this example, the magnitude is the difference between 35 and 9. In other embodiments, the shift may be made to a next level simply based on having reached a boundary. At Level 1, the comparisons quick(17) AND red(35) and quick(25) AND red(35). 33 is a boundary, so comparisons may be switched to Level 2. At level 2, the comparison is quick(33) AND red(35) and the end of the list designator is encountered [END]. Moving comparisons back to Level 1, the end of the list designator is encountered, so comparisons are once again switched to the data store reference list. The comparisons are quick(33) AND red(35) and quick(35) AND red(35) in the reference list, where an intersection is found.

In another embodiment, an offset correlation table may be used when a very large number of references are included in an index entry. Assume for example that the index entry for "quick" includes a list of records including all odd numbered records from 1 to 10,000. The index entry for "red" includes an entry for record 9 and 9,999. In other words, the index includes entries are as follows:

| | |
|---|---|
| quick | 1, 3, 7, . . . 9,995, 9,997, 9,999 |
| red | 9, 9,999 |

While the speedup structure described above could provide some efficiencies by eliminating comparisons, even greater efficiencies could be realized by eliminating even more comparisons using an offset correlation table speedup data structure.

Referring now to FIG. 1, an offset-correlation table 100 for the index entry for "quick" is illustrated. The offset correlation table 100 includes two columns, namely an offset column 102 and a records column 104. The offset column 102 includes the top ten binary bits of a fourteen bit number. The records column 104 includes records corresponding to a given offset. Illustrating now the relationship between the offsets in the offset column 102 and the records in the records column 104, each offset in the offset table 102 is the top ten bits of a fourteen bit number representing the records in the corresponding records entry in the records column 104. For example, the binary representation of the number 17 is 00000000010001. The top ten bits of this number are 0000000001, which is the off-set for record number 17. Similarly, the binary representation of 9,999 is 10011100001111, of which the top ten bits are 1001110000, which is the off-set that corresponds to 9,999 in the offset-correlation table 100.

Illustrating now an example, from the index above, a comparison has been made at record 9 for quick and red. Examination of the entry for "red" shows that the next comparison should be at 9,999. Rather than comparisons taking place for all of the record entries from 9 to 9,999 for the parameter pattern "quick," the offset correlation table can be used to jump past a large number of the records for "quick" to reduce the number of comparisons. In particular, the offset correlation table 100 can be referenced by referencing the first 10 binary bits representing 9,999. This is the entry 1001110000 illustrated at 106 in FIG. 1. Comparisons can then be made at 9,985, 9,987, 9,989, 9,991, 9,993, 9,995, 9,997 and 9,999, where a match is found. Thus, using the offset correlation table, nearly 5,000 comparisons were avoided. Notably, as with other speedup data structures, the decision to use the offset correlation table may be automatic or based on some factor such as the magnitude of the difference between comparisons, the percentage of the overall index that can be skipped, or other calculated factors.

As noted, some systems may include the ability to select whether or not to use the speedup data structures. In one embodiment, the decision to use a speedup data structure and what speedup data structure to use may be dependent on the size of the index. If the index is sufficiently small, no speedup data structure is used. If the index is of a moderate size, the binary bit shift speedup index may be used. If the index is large, the offset correlation table may be used. In this example, the type of speedup data structure used is selected based on an effort to balance the amount of speedup obtained against the cost of using a speedup data structure. In particular, the binary bit shift structure has some overhead processing that is required to use the structure. Similarly, the offset correlation table is expensive to use in terms of processing power. Thus, it may be more efficient to forgo use of the speedup data structure or to use a less efficient speedup data structure in some cases.

In one embodiment, speedup mechanisms are implemented as follows: for index records having less than 128 references to data store records, no speedup structure is used. For index records having 128 to 1024 references to data store records, a simple two, or more, level index structure may be implemented. Beyond 1024 reference in an index entry, an offset correlation table may be used.

Referring now to FIG. 2, an example method 200 including acts for determining one or more intersection points of parameter patterns in data items is shown. The method 200 may be practiced, for example, in a computing environment including a data store including data items. The parameter patterns are specified in a query including N parameter patterns. Notably, the query may be from a number of different sources. For example, the query may be a query sent by a human user. Alternatively, the query may be a query sent by another software module in a search engine system. Notably, in one embodiment, the query may include parameter patterns generated by a software module in response to a query submitted by a user. For example, a user may submit a query for "quick fox." A software module may generate alternatives for parameter patterns in this query, such that a query operated on by the method 200 includes the parameter patterns "fast fox."

The method 200 includes an act of identifying a first parameter pattern from the query as occurring less often in the index than at least one other parameter pattern specified in the query (act 202). For example, the following are two index entries for parameter patterns specified in a query:

| | |
|---|---|
| quick | 1, 3, 7, . . . 9,995, 9,997, 9,999 |
| red | 9, 9,999 |

In the example illustrated, "red" occurs less often, with two entries, in the data store, or the index than "quick," with 5,001 entries. Thus, red would be selected as the first parameter pattern as between the two illustrated parameter patterns. It is generally desirable to select as the first parameter pattern a parameter pattern that occurs less often in the data store as the sparseness of such an entry will allow entries for other parameter patterns to be jumped and excluded from searching as explained previously in conjunction with the description of speed-up data structures.

Notably, when more than two parameter patterns are specified in the query, selection of the first parameter pattern may be accomplished in a number of different ways. For example, in one embodiment, any parameter pattern from the query that occurs less often than another parameter pattern may be selected as the first parameter pattern. In other embodiments, the parameter pattern from the query that occurs the least among all parameter patterns specified in the query may be selected. In other embodiments, a parameter pattern that is generally among the least occurring may be selected. This may be done by grouping parameter patterns and randomly or otherwise selecting a parameter pattern from among a group of low occurring parameter patterns, selecting a parameter pattern that generally has a low occurrence in the data store, etc.

The method 200 further includes searching the data store until a present location of the data store has been identified as including the first parameter pattern (act 204). For example, using the index entries identified for "red" above, the present location can be identified as 9.

The method 200 further includes then searching the data store for a location of another parameter pattern from the query (act 206). Searching the data store for another parameter pattern may include searching for a parameter pattern other than the parameter pattern most recently found. Thus a location of parameter pattern other than "red" should found. In the present example, another parameter pattern is "quick." The location for the another parameter pattern should be at or after the present location of the first parameter pattern, or from next previously searched parameter pattern in the case where act 206 is performed as a result of a looping operation as will be discussed later herein.

The method 200 further illustrates at 208 that a determination is made to determine if the present location is identified as including the another parameter pattern, and when true, an indication is provided identifying an intersection (act 210). For example, as illustrates above, the parameter pattern "red" does occur at data store record 9, thus an indication is provided of the intersection. Providing an indication may be accomplished in a number of different ways including but not limited to one or more of the following. An indication may be provided directly to a user to indicate to the user that an intersection of parameter patterns has been discovered. A user may be a human user or another computing process using the functionality of method 200. The indication may include information indicating the record at which the intersection took place. The indication may include functionality for displaying all or portions of the record where the intersection took place. In some embodiments, the indication may be an indication such as a software flag, or software indication to other processes which allows further searching or further processing to be performed. For example, in one embodiment, the indication may be a software indicator indicating that a different parameter pattern from the query than those already found should be searched.

The method 200 illustrates that processing after providing an indication continues to a decision at 212 where a determination is made as to whether a pre-specified condition has been satisfied or not. While in the example shown in FIG. 2 this is shown as occurring after act 210, it should be appreciated that this may be performed at other times as well. Specifically, the ordering shown in FIG. 2 does not necessarily limit the order of acts being performed as claimed herein. Returning once again to the discussion of pre-specified conditions, it should be appreciated that a number of different pre-specified conditions may be determined. For example, as discussed above, the pre-specified condition may specify that a particular number of parameter pattern intersections have occurred. Alternatively, the pre-specified condition may specify that the entire data store has been searched. Other conditions as discussed herein or as may be apparent may qualify as pre-specified being satisfied.

If the pre-specified condition has been satisfied, the method 200 ends as illustrated at 214. Ending may include a number of different actions including returning output to a user, such as search results or other results, or forwarding data to other processes in a computing system. If the pre-specified condition has not been satisfied, method 200 illustrates that processing returns to act 206 to continue searching.

Returning once again to the decision at 208, if it is determined that the present location does not include the another parameter pattern, the method 200 includes continuing searching remaining portions of the data store to find a location of the another parameter pattern in the data store at a new present location (act 216). When the another parameter pattern is identified as being included at the new present location, the previous present location is replaced with the new present location where the another parameter pattern is identified as being included, such that the present location becomes the new present location.

FIG. 2 illustrates that the method 200 determines if a pre-specified condition has been satisfied (act 212) and either ending (act 214) or returning processing to searching for the location of another parameter pattern (act 206).

Notably, the method 200 may be performed where at least one of the acts of searching includes eliminating at least a portion of records of the data store from searching without being searched prior to being eliminated. This may be accomplished as described previously, for example, using one of the speed up data structures to jump records in the data store.

Returning now to the discussion of acts 206 and 216, searching for the location of another parameter pattern may include a number of different actions. For example, these acts may include searching the data store for a present location of a parameter pattern that has previously been found. For example, consider the following index entries for a query of "quick," "red," and "fox."

| | |
|---|---|
| fox | 5, 9, 11 |
| quick | 1, 3, 7, 11 |
| red | 5, 7, 11 |

The act 204 may locate the parameter pattern "fox" at data store record 5. The acts 206 and 216 may locate the parameter pattern "quick" at data store record 7. Assuming that a pre-specified condition has not been satisfied, processing returns to act 206 which specifies searching for the location of another parameter pattern. In this example, the another parameter pattern is a parameter pattern other than "quick," for which the most recently found location of parameter pattern has been found, but may be for "fox," a parameter pattern for which a location has been previously found during a previous instance of acts 204 or 206 and 216. Further illustrating this, an instance of 206 and 216 may find the location 9 for "fox." The next instance of 206 and 216 may find the location 11 for "quick." The next instance of 206 may then find the location 11 for "fox." At this point, the indication is provided (act 210) and a determination is made (act 212) as to whether a predetermined condition has been satisfied.

The method 200 may also be such that acts 206 and 216 search for the location of a different parameter pattern from the query, where the different parameter pattern is different than any other parameter pattern from among the N parameter patterns for which an intersection has been identified. Thus, continuing the example above, where the location 11 is found for "fox," searching may then shift to a different parameter pattern, "red." A search is made for the location of the parameter pattern "red" occurring at or after location 11. Because an occurrence of "red," which has not previously been searched for, does occur at location 11, indications are provided (act 210) and a determination is made (act 212) as to whether a predetermined condition has been satisfied.

In some embodiment, this type of searching may be iteratively performed. For example, consider an example where four parameter patterns are being searched to find intersection locations. The parameter patterns, ranked in order as occurring least often in the data store to most often in the data store are A, B, C, and D. Searching proceeds as follows: The locations for A and B are alternately found, where the found locations occur at or after the next most recently found location. When A and B are found at a present location, searching shifts to C to determine if C occurs at the present location. If C is not at the present location, but at a new present location, searching shifts back to A at or after the new present location. Searching for A and B continues as described above until a present location is found where both A and B occur, where a search for C at or after the present location occurs. If A, B, and C all occur at the present location, then searching shifts to D at or after the present location. The search for the location of D proceeds as described for C above. Searching continues in this fashion until a predetermined condition is satisfied. These principles can be extended to any number of parameter patterns.

The method 200 may be performed where, as illustrated in the example above, the N parameter patterns specified in the query are absolutely ordered in order from a parameter pattern appearing least frequently in the data store to a parameter pattern appearing most frequently in the data store. Searching the data store for a location of another parameter pattern from the query is performed repeatedly using the absolute ordering such that lower frequency parameter patterns are searched before higher frequency parameter patterns.

Alternatively, the N parameter patterns specified in the query are generally ordered in order from a parameter pattern appearing least frequently in the data store to a parameter pattern appearing most frequently in the data store. Searching the data store for a location of another parameter pattern from the query is performed repeatedly using the general ordering such that lower frequency parameter patterns are generally searched before higher frequency parameter patterns.

The method 200 may be performed such that the predetermined condition includes identifying a predetermined number of locations where all N parameter patterns intersect. For example, searching may continue until a given number of data store record locations are found including all three parameter patterns "quick," ".red," and "fox."

In some embodiments, the method 200 may be performed on a data store that has data items organized in a ranked fashion. As such, searching is performed such that highest ranked data items are searched for parameter patters, by virtue of being in lower numbered record locations, before lower ranked data items. In this example, ordering may be accomplished in a number of different ways. For example, data items may be ordered by topical relevance in the data store. In another embodiment, data items are ordered by at least one of appropriateness or degree of entity formulating the search. For example, the data store may be ordered assuming that persons querying the data store have at least a masters degree in some given field of science. Such a data store may include articles by highly respected scholars at the beginning of the data store, while lesser respected scholars or casual observers commentary may be included later in the data store. The data items may be ordered in the data store by a linguistic profile.

Embodiments herein may be further enhanced by using an abbreviated index, such as the abbreviated index described in U.S. patent application Ser. No. 11/681,673, titled "Abbreviated Index" and filed on Mar. 2, 2007, which is incorporated herein by reference in its entirety. As described in that application, the use of randomization and/or spreading techniques used for index entries, as well as the searching by elision, or recognizing when there is an absence of a parameter pattern in a data store to forgo further data store processing, also contribute to efficiencies. Further, templates including combinations of parameter patterns may be indexed in the abbreviated index such that entire templates may be eliminated from searching.

Abbreviated indexing techniques will now be explained. Referring now to FIG. 3, an abbreviated index 302 is illustrated, which in this example is a 32 bit binary number. The abbreviated index 302 is shown with an index field 304 and a value field 306. Notably, the index field 304 in this example is shown for convenience of explanation. The value field 306, in this example, includes the 32 bit binary number stored in physical memory. The index field 304 includes hexadecimal index representations of each of the elements of the 32 bit number represented in the value field 306.

FIG. 3 further illustrates a numerical representation table 308. The numerical representation table 308 includes a parameter patterns field 310, a numerical representation field 312, a last 8 bits field 314, a last 5 bits field 316, and a hex of the last 5 bits field 318.

The parameter patterns field 310 includes parameters and patterns of parameters on which operations can be performed. In this example, a data structure includes the text phrase "The quick red fox." In the example shown, combinations of individual words are represented as parameter patterns in the parameter patterns field 310. For example, "fox" is illustrated as a parameter pattern. "red" is illustrated as a second parameter pattern. "red fox" is illustrated as a parameter pattern. And so forth. The example shown here shows in the parameter patterns field 310 all possible combinations of individual words in the phrase "The quick red fox" when ordered in the original ordering.

It should be appreciated, however, that parameter patterns may also be created to represent different orderings and combinations. For example, other embodiments may include parameter patterns such as "fox quick red." This pattern with the terms in simple alphabetical order without function words may be used to perform searches when correct ordering of search terms is not necessarily needed or to increase the confidence that a particular set of search terms are present in a data store. Further still, other parameter patterns may be included as illustrated in other examples illustrated herein below. Other types of patterns that can be applied to the abbreviated index or other index embodiments include, but are not limited to synonyms, homonyms, term attributes, proximities, term order, frequency, location, partial or incomplete terms, customized descriptions, related terms, phonetic, syntactic or semantic linguistic descriptions and so forth.

In the example illustrated in FIG. 3, the parameter patterns field 310 represents search strings that may be performed to locate elements in a data store, such as a data store including the phrase "The quick red fox."

The numerical representation field 312 in this example includes a numerical representation of each of the parameter patterns in the parameter patterns field 310. The numerical representations may be generated in any suitable fashion. In this particular example the numerical representations are hash values of the parameter patterns. For example, a hash calculation may be performed for the parameter "fox." This hash calculation results in a number, which in this example is represented as a 64 bit hexadecimal number. Preferably, the hash calculation is performed using a good algorithm that results in a high percentage of unique numbers for calculations performed on different parameters and parameter patterns. For example, it is preferable that a hash calculation for "fox" results in a number that is different from the hash calculation for "red." The other fields in the numerical representation table 308 will be explained in more detail at a later point herein. Notably, other identifiers than hash numbers may be used. Hash numbers are simply one embodiment of identifiers. Numerous other identifiers may be used as well. While numerous hash value calculations are illustrated herein, they are simply one example used for ease of understanding by describing a specific embodiment.

Referring once again to the abbreviated index 302, each of the elements of the value field 306 represents a portion of a numerical representation 312 in the numerical representation table 308. Thus, the value field 306 contains a representation that a parameter pattern may be included in a set of parameters, such as a data store, based on the calculated hash for the parameter pattern. In this example, when a bit is set or as used herein "true," i.e. "1" in an element of the value field 306, this is an indication that a parameter pattern may be included within a set of parameters.

For effective results, the abbreviated index typically includes a number of elements that is equal to or greater than some multiple greater than 1 of the number of parameter patterns for a set of parameters. In the present example, 15 parameter patterns are included in the illustrated set of parameters. The abbreviated index 302 corresponding to the set of parameters therefore includes 32 elements (i.e. the 32 binary digits of the 32 bit binary number in the abbreviated index 302) which is a value greater than 2× of 15. Notably, the number of a multiplier (in this example 2) provides greater confidence that a parameter pattern is included in the set of parameters as the multiplier increases. For example, in the present 2× example, if a bit in the abbreviated index is set indicating that a parameter pattern may be included in the set of parameters, the confidence is about 50%. If a 64 bit binary number representing a 4× multiplier is used to represent the abbreviated index, confidence can be increased to about 75%. Similar increases in confidence can be achieved as the number of elements used to represent the abbreviated index is increased.

Notably, the examples above use a data structure for the abbreviated index 302 that is of a size that corresponds to numbers that can be represented by a set of binary bits. For example, a 2× setting of a four bit binary structure (up to 16 binary numbers) can be represented by a 32 bit data structure. A 2× setting of a 5 bit binary structure (up to 32 binary numbers) can be represented by a 64 bit data structure, and so forth.

Now with particular emphasis on how the existence of parameter patterns are noted in the abbreviated index 302, note that FIG. 3 includes the last five bits of hash field 316. The last five bits of hash field represents the last five binary bits of the hexadecimal number in the numerical representation field 312. Five bits are selected because that is the number of binary bits needed to represent 32 unique binary numbers, the number of binary bits in the abbreviated index 302. Note that while the last five bits have been chosen in this example, embodiments are not limited to just the last bits. Any appropriate selection of bits can be used. In this example, so long as the same bits are used consistently to set bits in the abbreviated index 302, effective filtering can be performed.

For illustration purposes, the last 8 bits of the numerical representation in the numerical representation field 312 can be calculated by converting the last two hexadecimal numbers to binary numbers. For example, for the parameter pattern "fox" in the parameter pattern patterns field 310, a hash of 40b8636cf497235c is calculated as shown in the numerical representation field 312. The last two hexadecimal numbers of the hash are 5c. These numbers represent the 8 bit binary number 01011100 as shown in the last 8 bits of hash field 314. By truncating the three most significant bits, the five least significant bits remain which are 11100 as shown in the last 5 bits of hash field 316. For simplicity in explanation, the last 5 bits can then be converted back to a hexadecimal number, which is 1c as shown in the hex of the last 5 bits field 318.

Thus the bit indexed by 1c in the index field 304 is set in the value field of the abbreviated index 302. As illustrated, continuing this process for each of the parameter patterns in the parameter patterns field 310 results in the element in the value field 306 corresponding to the index numbers of 3, 5, 9, d, 11, 15, 16, 18, 1c, and 1f in the index field 304 of the abbreviated index 302 are set. Notably, the abbreviated index 302 includes a sampling of representations that can be maintained by the abbreviated index.

Before performing a full text search on, for example a data store, a check of the abbreviated index 302 can be made for the parameter pattern. This can be done by hashing the parameter pattern, and in this case, checking the last 5 bits of the hash as an identifier for the parameter pattern to see if the identifier appears in the abbreviated index 302. If it does not appear in the abbreviated index, it can be determined with 100% accuracy that the particular parameter pattern does not exist in the data store front-ended by the abbreviated index 302. However, if the identifier is in the abbreviated index 302 it is known, in this example, that there is about a 50% chance that the parameter pattern appears in the data store. This confidence can be increased by searching of related parameter patterns. For example, if the search term entered by a user is "quick red fox," confidence can be increased by checking the abbreviated index 302 for indicators for "quick," "quick red," "red fox," "red," etc.

Attention is directed once again to subject matter where an identifier such as a hash identifier, where a hash identifier is any identifier associated with a parameter pattern, can be used as an index entry in place of usual index entries, such as words or phrases. For example, FIG. 4A illustrates a linked list hash index 400 which indexes parameter patterns by indexing sorted hash keys. FIG. 4A includes a hash identifier column 402. The hash identifier column 402 includes a number of hash keys. Each of the hash keys in the hash identifier column 402 is the result of performing a hashing algorithm on a parameter pattern that is to be indexed. The hash identifiers are organized in an ascending numerical order so as to accomplish efficient entry into the hash index 400 as will be explained in more detail in conjunction with the explanation of FIG. 5. The hash index 400 includes an index record address column 404. The index record address may be a physical memory address where each entry in the index is stored.

Illustrating now a concrete example for illustration purposes only, assume that a system is to index the parameter pattern "quick." Assume further, that a particular hashing algorithm when applied to the parameter pattern "quick" yields a hash identifier of 0b0e3aee. This hash identifier may be indicated in an abbreviated index such as the abbreviated index 402 shown in FIG. 4. The hash identifier may also be stored in a linked list index 400 where the hash identifier is correlated with an index record address such as the ones illustrated in the index record address column 404. When a data store is indexed to facilitate searching, instead of indexing the term "quick", the hash identifier 0b0e3aee will be indexed. Thus as illustrated in FIG. 4A, an index record located at 0345 includes references to five data store records in the data store being indexed including record numbers 1, 2, 3, 5 and 7.

Similarly, when an index is referenced to identify references to records in the data store which include a particular parameter pattern, rather than searching the index for the parameter pattern, the parameter pattern specified in a search is hashed using the hashing algorithm used to create the index of hash identifiers, yielding a search hash identifier, after which the linked list index 400 is searched for the search hash identifier. Once the search hash identifier is identified in the linked list index 400, an index record address corresponding to the hash identifier is accessed to identify data store records including the parameter patterns specified in the search. Using hash identifiers instead of actual parameter patterns or search terms provides a number of advantages. For example, if a good hash algorithm is used which results in a highly uniform distribution of hash values across a range of hash values, efficiencies can be obtained by spreading dense areas of an index into less dense areas of the index.

Another optimization can be realized through proper selection of hashing algorithms to take advantage of processor caching. For example, consider a case where a hashing algorithm is used that generates similar hash identifiers when similar parameter patterns are hashed. Further, consider that searching a data store may be performed by searching related parameter patterns. For example, consider a case where a search is being made of the Social Security Death Index for an individual for which one is certain about the birth date, but uncertain about the death date. Thus, a search may be performed around a given death date. In other words, the search performed searches dates that re near a specified date. Consider the following parameter patterns and their related hash codes:

```
A1: MillettHoward1918-1968 hash key 1095706729
A1: MillettHoward1918-1969 hash key 1095706728
A1: MillettHoward1918-1967 hash key 1095706726
```

Note, that the last digit difference in the date results in only differences at the end of the hash. The offset correlation table entry for each of these hash codes will be the same for all three of these cases. Additionally, the offset correlation table entry will be cached in the processor the first time it is processed as will the entry position in the actual hash key records. Most of the time cost will be here because there are few hits. Extra speed is accomplished by having hash codes related into groups that allow for processor caching of memory to help with acceleration.

Additionally, when testing a bit in an abbreviated pattern index, which can only indicate for sure that a parameter pattern is not included in a data store, another speedup is realized by taking advantage of the caching hierarchy in the computer.

One algorithm that can be used to accomplish the related hash codes above is as follows:

```
for( unsigned int i = 0; i < (U32) len; i++) {
    hash ^= ((i & 1) == 0) ? ( (hash << 7) ^ str[i] ^ (hash >> 3)) :
        (~((hash << 11) ^ str[i] ^ (hash >> 5))); // AP hash }
```

The hashing algorithms for this algorithm can be obtained from Arash Partow at his website www.partow.net.

A further optimization using the linked list index 400 includes the use of an offset correlation table for efficient indexing of parameter patterns as identifiers into the linked list index 400 during the indexing phase of the index. For example, FIG. 5 illustrates an offset correlation table 500 used for efficiently entering data store records into an index record. In spite of indexing hashes instead of traditional words or phrases, the index 400 may nonetheless be generated very quickly and updated very quickly using a number of optimizations. For example, the index 400 may be generated very quickly by simply using hash calculations that have already been calculated for parameters patterns at a parse phase of a data store. For example, a parse phase may be performed to generate the abbreviated index described previously. As a result of the parse phase, a correlation can be maintained for parameter patterns and their corresponding hashes. This correlation can then later be used to create the hash index 400.

Additionally, using certain optimizing techniques, the hash index 400 can be updated in a particularly fast manner. One such technique involves the use of an offset correlation table, such as the offset correlation table 500 illustrated in FIG. 5. The offset correlation table 500 includes portions of hash codes correlated to index entry addresses. In the example shown, the top four bits of a hash are correlated to an index record address. In the example shown, the index address correlated with the top four bits is the index address of an instance of those top four bits in the hash index. When the offset correlation table is first constructed, it may include, in one example, the first instance of a first four bits. For example, the hash index 400 includes two entries where the top four bits are 0000, namely entries at 0345 and 1297. The index 400 is ordered by ascending hash number order. Thus, the first instance in the index of the top four binary bits being 0000 is the hexadecimal hash 0b0e3aee, which comes before 0da77c46. Thus, in the offset correlation table, 0000 is correlated with 0345, the index record address of 0b0e3aee.

Notably, adding index entries to the index 400 may result in the offset correlation table 500 not indexing the first instance of a first four bits. Additionally, there is no requirement that the first instance of the first four bits be indexed. The offset correlation table 500 may be used efficiently in embodiments where any instance of a portion of a hash is used.

To perform indexing using an offset correlation table, an attempt is made to locate an index address of an index record including a hash indexed in the index by jumping to the address correlated to the first four bits of the hash. The linked list illustrated in the previous index record column 406 and the next index record column 408 of the index can then be used to navigate to the appropriate record, or to determine that a new record should be added to index a parameter pattern by its hash code. Notably, the preceding should not be interpreted as the only method of using the offset correlation table. Other embodiments may vary ordering of the hash entries and thus vary how the index is traversed. These variations are still within the scope of what is contemplated by the subject matter disclosed herein.

Illustrating now one specific example of how this functionality may be implemented, assume that a parameter pattern is identified for indexing. A hash for the parameter pattern may also be identified. In one embodiment hash codes may be identified by reference to a correlation between parameter patterns and hash codes created during the parse phase of a data store. In an alternative embodiment, hash codes may be calculated dynamically when a parameter pattern is identified. Other methods of identifying a hash code may also be used. Returning now to the present example, assume that the hash code identified is 7cfc6d29, and the parameter pattern corresponding to this hash code is stored at record 12 of a data store. Thus to index the instance of the particular parameter pattern in the index, the first four bits of the hash are identified. The first four bits are 0111. By referencing the offset correlation table 500, it can be determined that the first instance of these four first binary bits occurs at index record 4397, which includes the hash code 79f0a667. A comparison is performed of the hash code for the parameter pattern to be indexed, i.e. 7cfc6d29, to the first instance of the first four bits 0111 in the index, i.e. 79f0a667. Because the hash codes do not match, and because the hash code for the parameter pattern to be indexed is greater than the hash code it was compared to, the next instance of the first four binary bits 0111 is accessed. This is performed by using the linked list shown at the next index record column 408 in the index 400. The linked list indicates that the next instance occurs as index record number 7730. As such, the index record at 7730 is accessed. The index record at 7730 indexes the hash code 7cfc6d29. A comparison is made of this hash code to the hash code for the parameter pattern to be indexed, which is also 7cfc6d29. Thus, the data store records entry of at the index entry 7730 can be updated to include the data store record 12 where the parameter pattern being indexed is found.

An offset correlation table can also be used to quickly determine that a hash code has not been indexed in an index to facilitate indexing of the hash code. For example, assume that the hash code identified for a parameter pattern is 5b72a624. The top four bits of this hash code is 0101. Referencing the offset correlation table 500 for the entry including 0101 reveals that a negative number is correlated with the 0101 entry. In this example, the presence of a negative number indicates that there are no entries in the index 400 for hash codes with the first four bits being 0101. Other indicators may alternatively be used, and the negative number indicator is simply one example.

Using the negative number, however can be used to include other information as well. In the example shown, the magnitude of the negative number indicates the next record of the offset correlation table 500 that properly indexes a first four bit identifier that is included in the hash index 400. For example, the entry for 0101 indicates that one entry forward, entry 0110 in the offset correlation table 500, includes an address with an instance of 0110. Similarly, the indicator −2 at entry 1001 of the offset correlation table 500 indicates that moving forward two entries to 1011 leads to an entry that indexes an index 400 record address which includes an instance of the first four bits 0111.

Returning now to the example where an entry does not exist in the index 400 for the hash code 5b72a624, as illustrated in FIG. 4B at 410, the hash code can be entered into the index 400 along with the data store record for the parameter pattern corresponding to the hash code. Additionally, as shown at 410, the Next Index Record entry for the index entry preceding the added index entry, and the Previous Index Record entry for the index entry following the added index entry are updated as appropriate to include the addition of the new index entry.

Because the offset correlation table 500 only provides an entry point into the index 400 to facilitate quicker searching of the index 400, in some embodiments, the offset correlation table 500 only needs to be updated conditionally depending on the nature of a new entry into the index 400. For example, in one embodiment, the offset correlation table 500 is updated when the offset correlation table 500 entry that is used to access the new index entry 400 is a negative number. The offset correlation table 500 entry is updated to point to the new entry in the index 400 so that it can be found on a subsequent addition to the data store records listing on the hash code. For the example illustrated here, this is shown at 502 in FIG. 5B where the entry of 0101 is updated to correlate with the index record address f01f Notably, other negative indicators in a series of negative indicators may also need to be readjusted to reflect the new number of entries until a valid entry is found. For example, assume that the entry 1010 in offset correlation table 500 is updated with an index record address, then the index entry 1001 should be updated by changing the −2 to −1.

The offset correlation table 500 should also updated in the current example when a new entry into the index 400 is prior to an existing correlating entry in the offset correlation table 500 for the group to which to which the new index entry belongs. For example, if a new hash code 69897969 was inserted with address f936, it would be ordered before the entry with address 8c01 and hash code 689fb69a. This new hash code is now the first of the group correlated to 0110 in the offset correlation table 500 and is ordered as such to be found in subsequent searches using the offset correlation table 500. The entry for 0110 in the offset correlation table is set to f936 instead of its current 8c01. On the other hand, if a new hash code 60102001 was added, it is not the first one of that group beginning with 689fb69a such that no changes to the offset correlation table would be needed.

The offset correlation table 500 can also be updated or regenerated independent of the nature of the updated entries to the index 400. In some embodiments, regeneration of the offset correlation table 500 may be tied to the size of the index 400. For example, in one embodiment, the offset correlation table may be regenerated each time the index 400 doubles in size.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including a data store including data items, a method for determining one or more intersection points of parameter patterns in data items, the parameter patterns being specified in a query of a data store including records identified by sequentially ordered identifiers, the query including N parameter patterns to attempt to locate one or more records including the N parameter patterns, the method comprising a computing system performing the following:
   a) identifying a first parameter pattern from a query, the parameter patterns being specified in a query of a data store including records identified by sequentially ordered identifiers, the query including N parameter patterns to attempt to locate one or more records including the N parameter patterns to find one or more intersection points of parameter patterns in data items, wherein the first parameter pattern occurs less often in an index of records of a data store than at least one other parameter pattern specified in the query;
   b) searching the index until a record of the data store has been identified as including the first parameter pattern wherein a present location identifies the record of the data store identified as including the first parameter pattern;
   c) then searching the index for another parameter pattern from the query;
   d) if the present location is identified as including the another parameter pattern, as a result of searching the index for another parameter pattern, then providing an indication identifying a record at the present location as an intersection; else
   e) continuing searching remaining portions of the index to find the another parameter pattern in the data store at a different location, wherein the present location is then configured to identify the different location of the another parameter pattern in the data store; and
   wherein at least one of the acts of searching in acts b), c), and e) comprises eliminating at least a portion of records of the data store from searching without being searched prior to being eliminated using a speed-up data structure that skips comparison of record identifiers by skipping indexed record identifiers correlated to offsets in offset correlation table, wherein the offset correlation table indexes parameter patterns based on record identifier offsets, the offset correlation table including an offset column comprising record identifier offsets and a records column comprising record identifiers corresponding to the offsets, wherein the offsets are a predetermined portion of the corresponding record identifiers to which they correspond, wherein the portions of indexed record identifiers are skipped by skipping comparing indexed record identifiers based on the offset, and wherein eliminating at least a portion of records of the data store from searching without being searched prior to being eliminated is performed in response to an act of determining that eliminating at least a portion of records of the data store from searching without being searched prior to being eliminated would be more efficient, by using less processing power, than actually performing comparisons based on the distance between two record identifiers and the size of the database.

2. The method of claim 1, further comprising repeating acts c-e until a predetermined condition is satisfied.

3. The method of claim 2, wherein the predetermined condition comprises identifying a predetermined number of locations where all N parameter patterns intersect.

4. The method of claim 1, wherein repeating act c-e comprises searching the data store for a present location of a different parameter pattern from the search, wherein the different parameter pattern is different than any other parameter pattern from among the N parameter patterns for which an intersection has been identified.

5. The method of claim 1, wherein the data store has data items organized in a ranked fashion, and wherein searching is performed to cause highest ranked data items to be searched for parameter patters before lower ranked data items.

6. The method of claim 5, wherein data items are ordered by topical relevance.

7. The method of claim 5, wherein data items are ordered by at least one of appropriateness or degree of entity formulating the search.

8. The method of claim 5, wherein data items are ordered by a linguistic profile.

9. The method of claim 1, wherein eliminating at least a portion of records of the data store from searching comprises referencing a pointer directed to a location and wherein at least some locations between a current location and the location pointed to by the pointer are eliminated from searching.

10. The method of claim 9, wherein referencing a pointer comprises referencing an offset correlation table, the offset correlation table comprising portions of index entry reference values correlated to index entry addresses.

11. The method of claim 2, wherein the N parameter patterns specified in the query are absolutely ordered in order from a parameter pattern appearing least frequently in the data store to a parameter pattern appearing most frequently in the data store, and wherein searching the data store for a location of another parameter pattern from the query is performed repeatedly using the absolute ordering to cause lower frequency parameter patterns to be searched before higher frequency parameter patterns.

12. The method of claim 2, wherein the N parameter patterns specified in the query are generally ordered in order from a parameter pattern appearing least frequently in the data store to a parameter pattern appearing most frequently in the data store, and wherein searching the data store for a location of another parameter pattern from the query is performed repeatedly using the general ordering to cause lower frequency parameter patterns to be generally searched before higher frequency parameter patterns.

13. The method of claim 1, wherein at least one parameter pattern is a composite of other parameter patterns in the search.

14. In a computing environment including a data store including data items, a computer readable medium storing computer executable instructions that when executed by one or more processors cause the following acts to be performed:
   a) identifying a first parameter pattern from a query, the parameter patterns being specified in a query of a data store including records identified by sequentially ordered identifiers, the query including N parameter patterns to attempt to locate one or more records including the N parameter patterns to find one or more intersection points of parameter patterns in data items, wherein the first parameter pattern occurs less often in an index of records of a data store than at least one other parameter pattern specified in the query;
   b) searching the index until a record of the data store has been identified as including the first parameter pattern wherein a present location identifies the record of the data store identified as including the first parameter pattern;
   c) then searching the index for another parameter pattern from the query;
   d) if the present location is identified as including the another parameter pattern, as a result of searching the index for another parameter pattern, then providing an indication identifying a record at the present location as an intersection; else
   e) continuing searching remaining portions of the index to find the another parameter pattern in the data store at a different location, wherein the present location is then configured to identify the different location of the another parameter pattern in the data store; and
   wherein at least one of the acts of searching in acts b), c), and e) comprises eliminating at least a portion of records of the data store from searching without being searched prior to being eliminated using a speed-up data structure that skips comparison of record identifiers by skipping indexed record identifiers correlated to offsets in offset correlation table, wherein the offset correlation table indexes parameter patterns based on record identifier offsets, the offset correlation table including an offset column comprising record identifier offsets and a records column comprising record identifiers corresponding to the offsets, wherein the offsets are a predetermined portion of the corresponding record identifiers to which they correspond, wherein the portions of indexed record identifiers are skipped by skipping comparing indexed record identifiers based on the offset, and wherein eliminating at least a portion of records of the data store from searching without being searched prior to being eliminated is performed in response to an act of determining that eliminating at least a portion of records of the data store from searching without being searched prior to being eliminated would be more efficient, by using less processing power, than actually performing comparisons based on the distance between two record identifiers and the size of the database.

15. In a computing environment including a data store including data items, a system for determining one or more intersection points of parameter patterns in data items, the system comprising:
   one or more processors;
   a computer readable memory coupled to the one or more processors, the computer readable memory storing computer executable instructions that when executed by the one or more processors cause the following acts to be performed:
   a) identifying a first parameter pattern from a query, the parameter patterns being specified in a query of a data store including records identified by sequentially ordered identifiers, the query including N parameter patterns to attempt to locate one or more records including the N parameter patterns to find one or more intersection points of parameter patterns in data items, wherein the first parameter pattern occurs less often in an index of records of a data store than at least one other parameter pattern specified in the query;
   b) searching the index until a record of the data store has been identified as including the first parameter pattern wherein a present location identifies the record of the data store identified as including the first parameter pattern;
   c) then searching the index for another parameter pattern from the query;
   d) if the present location is identified as including the another parameter pattern, as a result of searching the index for another parameter pattern, then providing an indication identifying a record at the present location as an intersection; else
   e) continuing searching remaining portions of the index to find the another parameter pattern in the data store at a different location, wherein the present location is then configured to identify the different location of the another parameter pattern in the data store; and
   wherein at least one of the acts of searching in acts b), c), and e) comprises eliminating at least a portion of records of the data store from searching without being searched prior to being eliminated using a speed-up data structure that skips comparison of record identifiers by skipping indexed record identifiers correlated to offsets in offset correlation table, wherein the offset correlation table indexes parameter patterns based on record identifier offsets, the offset correlation table including an offset column comprising record identifier offsets and a records column comprising record identifiers corresponding to the offsets, wherein the offsets are a predetermined portion of the corresponding record identifiers to which they correspond, wherein the portions of indexed record identifiers are skipped by skipping comparing indexed record identifiers based on the offset, and wherein eliminating at least a portion of records of the data store from searching without being searched prior to being eliminated is performed in response to an act of determining that eliminating at least a portion of records of the data store from searching without being searched prior to being eliminated would be more efficient, by using less processing power, than actually performing comparisons based on the distance between two record identifiers and the size of the database.

16. The method of claim 2, wherein when repeating acts c-e, the another parameter pattern in at least some subsequent iterations alternates between the first parameter pattern and a second parameter pattern.

* * * * *

UNITED STATES PATENT AND TRADEMARK OFFICE
CERTIFICATE OF CORRECTION

Page 1 of 4

PATENT NO.       : 7,774,347 B2
APPLICATION NO.  : 11/847688
DATED            : August 10, 2010
INVENTOR(S)      : Millett et al.

It is certified that error appears in the above-identified patent and that said Letters Patent is hereby corrected as shown below:

Drawings
Sheet 3, replace Figure 3 with the figure depicted below, wherein the reference number "300" has been changed to --308--

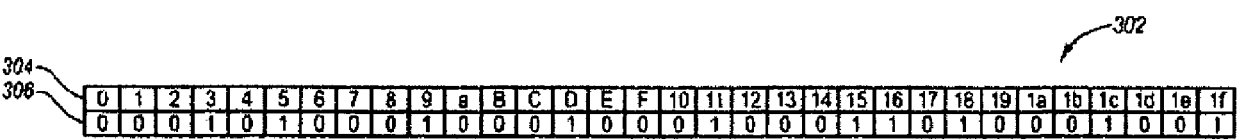

FIG. 3

Column 2
Line 2, change "are" to --is--

Signed and Sealed this
Fifteenth Day of March, 2011

David J. Kappos
*Director of the United States Patent and Trademark Office*

Column 3
Line 25, change "parameters" to --parameter--
Line 32, before "For" insert --.--
Line 55, change "quick" to --"quick"--

Column 4
Line 7, change "record I" to --record number 1--
Line 11, unbold "5"
Line 13, unbold "5"
Line 14, unbold "1"
Line 24, unbold "9, 13, 500, 723"

Column 5
Line 9, unbold "5"

Column 6
Line 14, unbold "10"

Column 7
Line 45, change "should found" to --should be found--
Line 56, change "illustrates" to --illustrated--
Line 57, unbold "9"

Column 9
Line 2, unbold "5"
Line 3, unbold "7"
Line 13, unbold "9"
Line 14, unbold "11"
Line 15, unbold "11"
Line 23, unbold "11"
Line 26, unbold "11"
Line 28, unbold "11"

Column 10
Line 8, change ""."red,"" to --"red,"--
Line 12, change "patters" to --patterns--

Column 11
Line 51, change "abbreviated index" to --abbreviated index 302--

Column 13
Line 58, change "re" to --are--

CERTIFICATE OF CORRECTION (continued)
U.S. Pat. No. 7,774,347 B2

Column 14
Line 39, change "parameters" to --parameter--

Column 15
Line 45, unbold "7730"
Line 46, unbold "7730"
Line 49, remove [of]
Line 49, unbold "7730"
Line 50, unbold "12"

Column 16
Line 32, change "f01f" to --f107--
Line 39, after "also" insert --be--
Line 42, remove the second instance of [to which]

Column 18
Line 8, after "in" insert --an--
Line 42, change "patters" to --patterns--